United States Patent [19]

Mowry et al.

[11] Patent Number: 5,930,434

[45] Date of Patent: Jul. 27, 1999

[54] OPTICAL DISC DATA STORAGE SYSTEM USING OPTICAL WAVEGUIDE

[75] Inventors: Gregory S. Mowry, Burnsville, Minn.; Roger K. Malmhall, Mountain View, Calif.

[73] Assignee: Seagate Technology,. Inc., Scotts Valley, Calif.

[21] Appl. No.: 08/973,089

[22] PCT Filed: Aug. 29, 1997

[86] PCT No.: PCT/US97/15361

§ 371 Date: Oct. 16, 1997

§ 102(e) Date: Oct. 16, 1997

[87] PCT Pub. No.: WO98/52193

PCT Pub. Date: Nov. 19, 1998

Related U.S. Application Data

[60] Provisional application No. 60/046,426, May 15, 1997.

[51] Int. Cl.$^6$ ................................................. G02B 6/02
[52] U.S. Cl. ................................................. 385/124
[58] Field of Search ...................... 385/123–126, 385/147, 33; 359/368; 250/227.26, 227.11; 369/13, 14, 126, 44.14, 44.11, 112, 110, 32, 44.23; 360/114, 103

[56] References Cited

U.S. PATENT DOCUMENTS

| | | | |
|---|---|---|---|
| 3,980,811 | 9/1976 | Schaefer et al. | 178/6.6 R |
| 4,229,067 | 10/1980 | Love | 350/96.15 |
| 4,310,916 | 1/1982 | Dil | 369/109 |
| 4,443,700 | 4/1984 | Macedo et al. | 250/227 |
| 4,569,038 | 2/1986 | Nagashima et al. | 369/44 |
| 4,581,529 | 4/1986 | Gordon | 250/227 |
| 4,706,235 | 11/1987 | Melbye | 369/46 |
| 4,769,800 | 9/1988 | Moser et al. | 369/32 |
| 4,815,064 | 3/1989 | Melbye | 369/59 |
| 4,933,537 | 6/1990 | Takahashi et al. | 235/454 |
| 4,994,658 | 2/1991 | Takahashi et al. | 235/473 |
| 5,004,307 | 4/1991 | Kino et al. | 350/1.2 |
| 5,065,390 | 11/1991 | Miyaauchi et al. | 369/110 |
| 5,096,277 | 3/1992 | Kleinerman | 385/12 |
| 5,125,750 | 6/1992 | Corle et al. | 359/819 |
| 5,138,676 | 8/1992 | Stowe et al. | 385/32 |
| 5,153,870 | 10/1992 | Lee et al. | 369/111 |
| 5,193,132 | 3/1993 | Uken et al. | 385/32 |
| 5,199,090 | 3/1993 | Bell | 385/13 |
| 5,212,379 | 5/1993 | Nafarrate et al. | 250/227.14 |
| 5,278,812 | 1/1994 | Adar et al. | 369/44.12 |
| 5,286,971 | 2/1994 | Betzig et al. | 250/227.26 |
| 5,363,463 | 11/1994 | Kleinerman | 385/123 |
| 5,450,203 | 9/1995 | Penkethman | 356/373 |
| 5,493,393 | 2/1996 | Beranek et al. | 356/328 |
| 5,497,359 | 3/1996 | Mamin et al. | 369/44.15 |
| 5,535,189 | 7/1996 | Alon et al. | 369/102 |
| 5,537,385 | 7/1996 | Alon et al. | 369/119 |
| 5,566,159 | 10/1996 | Shapira | 369/99 |
| 5,574,712 | 11/1996 | Alon et al. | 369/102 |
| 5,592,444 | 1/1997 | Alon et al. | 369/13 |
| 5,598,393 | 1/1997 | Alon et al. | 369/102 |
| 5,615,192 | 3/1997 | Kikukawa et al. | 369/59 |
| 5,831,797 | 11/1998 | Schaenzer et al. | 369/13 |
| 5,870,362 | 2/1999 | Boutaghou et al. | 369/44.14 |

*Primary Examiner*—Akm E. Ullah
*Attorney, Agent, or Firm*—Flehr Hobach Test Albriton & Herbert LLP

[57] ABSTRACT

An optical disc data storage system includes an optical disc for storing information in an optically readable format on a data surface. The slider is positioned proximate the data surface of the optical disc. An actuator coupled to the slider selectively positions the slider relative to the data surface. An optical waveguide having a radially graded index of refraction extends between a first end positioned proximate the light source and a second end coupled to the slider and positioned proximate the data surface. The optical fiber carries light therebetween.

10 Claims, 3 Drawing Sheets

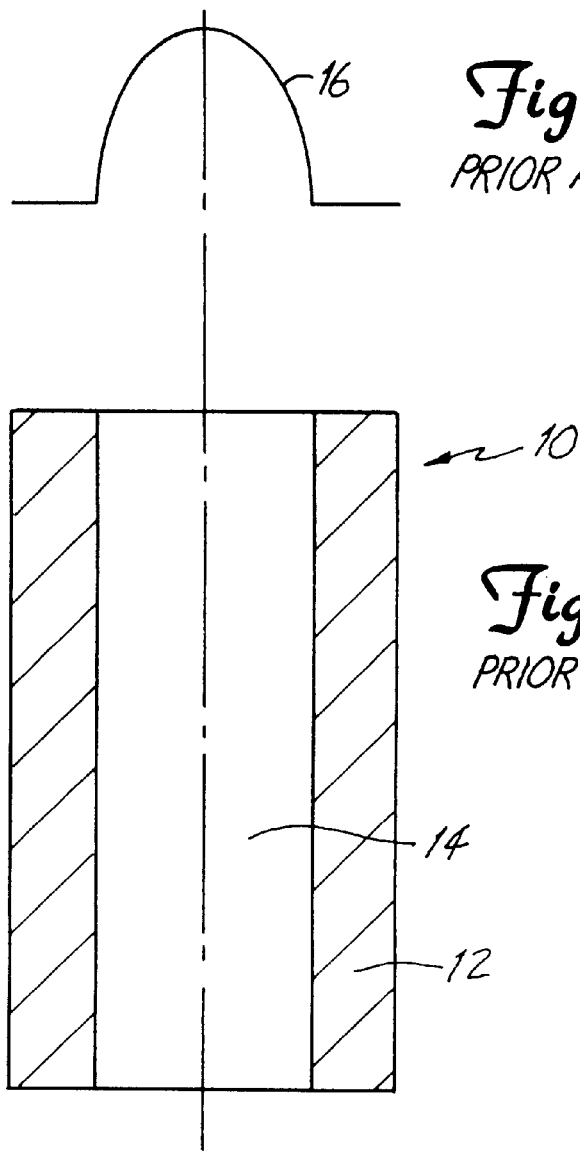
*Fig. 1C*
PRIOR ART
*Fig. 1A*
PRIOR ART
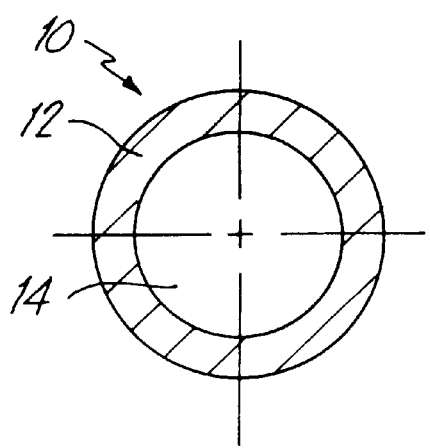
*Fig. 1B*
PRIOR ART

OPTICAL DISC DATA STORAGE SYSTEM USING OPTICAL WAVEGUIDE

This application is based on Provisional Application Ser. No. 60/046,426, filed on May 15, 1997.

BACKGROUND OF THE INVENTION

The present invention relates generally to optical disc data storage systems. More specifically, the present invention relates to optical disc data storage systems which use near field recording techniques.

Optical data storage disc systems are a promising technology for storing large quantities of data. The data is accessed by focusing a laser beam or other light source onto a data surface of the disc and analyzing light reflected from or transmitted through the data surface. In general, in optical storage systems, data is in the form of marks carried on the surface of the disc which are detected using the reflected laser light. There are a number of different optical disc technologies which are known in the industry. For example, compact discs are currently used to store digital data such as computer programs or digitized music. Typically, compact discs are permanently recorded during manufacture. Another type of optical system is a write-once read-many (WORM) system in which a user may permanently write information onto a blank disc. Other types of systems are erasable, such as phase change and magneto-optic (M-O) systems. Phase change systems detect data by sensing a change in reflectivity. M-O systems read data by measuring the rotation of the incident light polarization due to the storage medium.

The above systems require a beam of light to be focused onto a data surface of a disc and recovering the reflected light. Storage density is determined not only by the size of the markings on the data surface, but also by the size of the beam focused on the surface (i.e. resolution). One type of optical element which can be used in conjunction with an objective lens to reduce the ultimate spot size of the light beam is a Solid-Immersion-Lens or SIL. A SIL reduces the beam spot size by virtue of the wavelength reduction which occurs when light is inside an optically dense medium. The SIL is positioned very close to the data surface of the disc and couples to the disc surface via evanescent waves. The use of SILs for data storage is described in U.S. Pat. No. 5,125,750 to Corle et al. which issued Jun. 30, 1992 and in U.S. Pat. No. 5,497,359 to Mamin et al. which issued Mar. 5, 1996. In these optical systems, a laser beam is focused onto the SIL using an objective lens. The SIL is preferably carried on a slider and the slider is positioned close to the disc data surface.

Another type of optical element used for near field recording is an optical probe consisting of a tapered optical fiber. U.S. Pat. No. 5,286,971, issued Feb. 15, 1994 to Betzig et al. describes such a system. The system described in the Betzig et al. patent uses an optical fiber 70 which couples to a probe 20 which, has a tapered profile as shown in FIG. 5 of the Betzig patent. Another technique for near field coupling in optical systems is the use of a pin hole aperture. Such a lens is typically a short waveguide made by selectively doping a glass fiber.

Another type of optical element is a lens formed by an optical fiber having a graded index of refraction. The fiber is used to focus the light rays onto the disc surface and typically operates in the "far-field" regime.

However, there is a continuing need for an inexpensive and easily produced head for optical recording systems which uses near-field coupling.

Further, the use of a solid immersion lens as taught by Corle et al. in U.S. Pat. No. 5,125,750 requires an objective lens that is relatively large and thus requires increased spacing thereby preventing size reductions.

SUMMARY OF THE INVENTION

An optical disc data storage system includes an optical disc for storing information in an optically is readable format on a data surface. A slider is positioned proximate the data surface of the optical disc and is coupled to an actuator which selectively positions the slider relative to the data surface. The storage system includes a light source and an optical fiber coupled to the slider. In one aspect of the invention, the optical fiber has a radially graded index of refraction and has a first end which is positioned adjacent and directed toward the light source and a second head coupled to the slider and having an axis directed substantially toward the data surface to couple light therebetween. The second end of the optical fiber is sufficiently close to the data surface whereby the light is coupled to the data surface in the near field. In one aspect, the optical fiber provides a substantially quadratic phase shift whereby a substantially collimated light beam from the light source oscillates through at least one focal point substantially evenly spaced along the length of the optical fiber and wherein the optical fiber has a length such that the second end is substantially positioned at one of the focal points.

BRIEF DESCRIPTION OF THE DRAWINGS

FIG. 1A is a side cross-sectional plan view of a waveguide having a graded index of refraction.

FIG. 1B is a top cross-sectional view of the waveguide of FIG. 1A.

FIG. 1C is a graph showing the index of refraction of the waveguide of FIGS. 1A and 1B versus radial position.

DETAILED DESCRIPTION OF THE PREFERRED EMBODIMENTS

Figure 2:
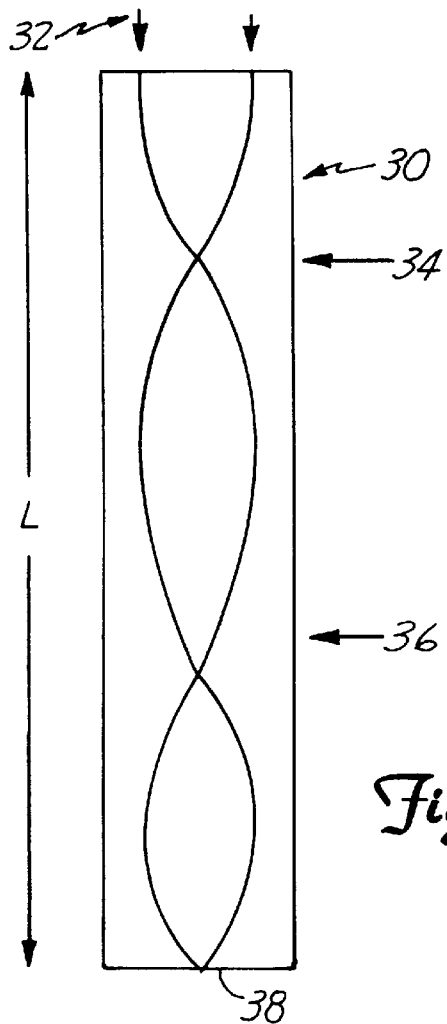
FIG. 2 is a cross-sectional view of an elongated waveguide having a graded index of refraction.

Optical storage systems appear as a promising technology which may ultimately replace magnetic storage systems. One particularly promising technique uses the near field (or evanescent) field to optically couple to a data surface. For example, U.S. Pat. No. 5,125,750 and U.S. Pat. No. 5,497,359 describes the use of a Solid-Immersion-Lens (SIL) which uses the near-field in an optical storage system. The system includes an objective lens and a hemispherical lens having a high index of refraction and located at the focal point of the objective lens. Inside the hemispherical SIL, the wave length of light changes from a free space value of $\lambda_0$ to $\lambda_0/n$, where n is the index of refraction of the SIL. Since the spot size of a Gaussian beam at the focal point of a lens is proportional to $\lambda/NA$, where NA describes the numerical aperture of the lens, the spot size inside the hemisphere is reduced by the index of refraction of the hemisphere. Further, if the data surface is brought into close proximity to the plano portion of the hemisphere, the small spot can be effectively transferred to the adjacent surface through near field (evanescent) coupling. Unfortunately, this system is difficult to manufacture, particularly at the relatively small sizes necessary in high density optical recording systems. For example, the spacing between the objective lens and the SIL is critical and limits the minimum spacing which can be achieved between adjacent discs when recording on a disc stack.

FIGS. 1A, 1B and 1C illustrate a waveguide 10 having a graded index of refraction. FIGS. 1A and 1B are side cross-sectional and top cross-sectional views, respectively, of a waveguide 10 having a graded index of refraction. Waveguide 10 includes an optional cladding layer 12 and a center light transmissive element 14. FIG. 1C is a profile 16 taken radially through lens 12 showing the index of refraction. As shown in FIG. 1C, the index of refraction is graded to form a parabola i.e., quadratic. It is known in the art that this profile imparts a quadratic phase factor to a collimated light beam input, which results in the light beam being focussed.

The present invention includes an optical fiber (or waveguide) having a radially graded index of refraction which is used for near field recording in an optical storage system. FIG. 2 is a side cross-sectional view of an elongated optical fiber (or waveguide) 30 for use in the present invention. Optical fiber 30 has a radially graded index of refraction, preferably having a substantially quadratic profile. Fiber 30 receives collimated input marginal waves 32. As waves 32 travel through fiber 30, the radially graded index of refraction causes waves 32 to oscillate through focal points and focus at a first focal point 34. The waves then tend to diverge and are refocussed at a second focal point 36. Thus, as shown in FIG. 2, the injected marginal waves 32 oscillate sinusoidally through a plurality of focal points evenly spaced along the length L of the fiber 30. In the configuration of FIG. 2, fiber 30 has a length (L) which is a multiple of the one half distance between focal points such that an output focal point 38 is formed. One aspect of the present invention is the recognition that by forming a focal point at the face of waveguide 30, the focussed optical beam can be coupled through the near field to an adjacent medium.

Figure 3:
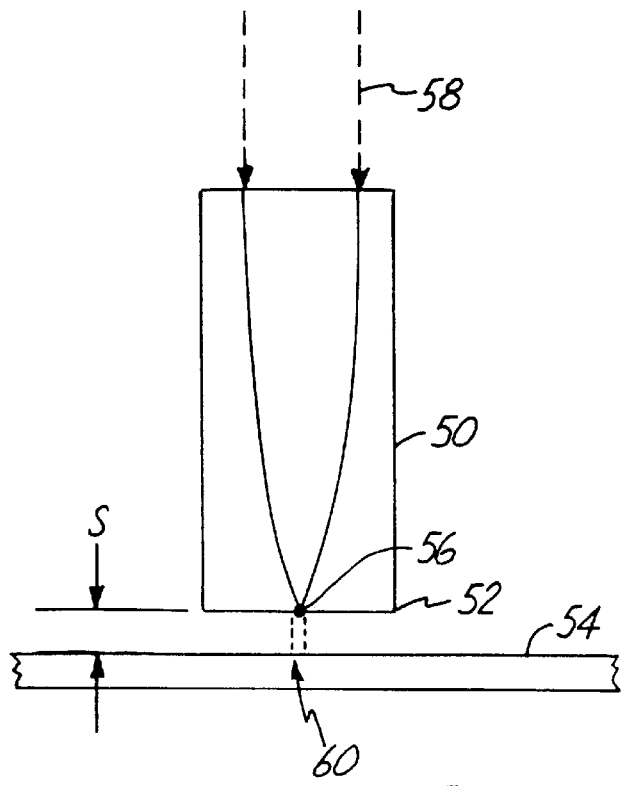
FIG. 3 is a side cross-sectional view of a waveguide having a graded index of refraction positioned adjacent an optical storage disc in accordance with the present invention.

FIG. 3 is a side cross-sectional view of a graded index optical waveguide 50 having a distal end 52 positioned adjacent a data surface of a disc 54. Optical fiber 50 receives collimated light 58 carries a light beam and provide focal point 56. Optical fiber distal end 52 is positioned a distance S above the data surface of disc 54. Optical fiber receives collimated light from a light source (not shown in FIG. 3) and has an overall length such that the focal point 56 is substantially located at distal end 52. Preferably distance S is on the order of, or less than, one wavelength whereby the light at focal point 56 is coupled to disc 54 through the near field (or evanescent field) to a point 60.

Figure 4:
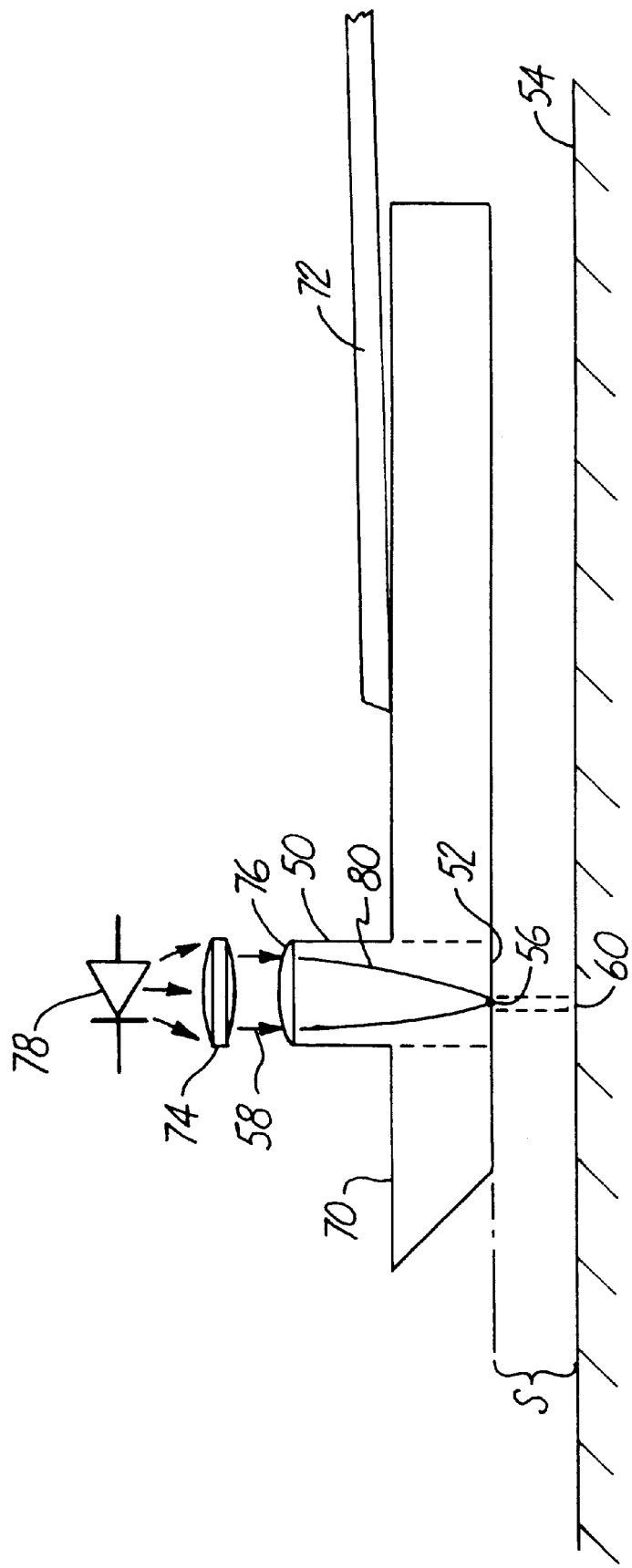
FIG. 4 is a side view of a slider carrying a waveguide in accordance with the present invention flying over an optical disc.

FIG. 4 is a simplified diagram showing a slider 70 carried on an elongated armature 72 over the data surface of disc 54. Slider 70 carries waveguide 50 for producing focussed spot 56 which couples through the near field to point 60. Additionally, an objective lens 74 is provided for producing collimated light 58 from light source 78. Further, in the embodiment shown in FIG. 4, waveguide 50 includes a top surface 76 having a desired profile to thereby act as a second lens. This can be used advantageously to maintain the size of spot 56 while scanning spot 56 between adjacent tracks on disc 58. Such scanning can be achieved, for example, through the use of a mirror. As discussed above, the length of waveguide 50 can be extended and preferably has an approximate length whereby light rays 80 form spot 56 at the distal end 52. Further, waveguide 50 can be slightly curved whereby light source 78 can be located in any desired position and does not need to be directly above spot 56. Fiber 50 is coupled to slider 70 through any appropriate technique. In one aspect of the invention, waveguide 50 is an integral component with slider 70 whereby slider 70, or at least a portion of slider 70 is formed of transparent material having an appropriate index of refraction which could be graded. Top surface 76 can be fabricated directly in waveguide 50 or it can be a separate piece which is bonded to waveguide 50.

The waveguide of the present invention may be formed of any appropriate material, such as those used in fabricating graded index optical fibers. Further, the invention may be used with optional objective lenses as desired.

Although the present invention has been described with reference to preferred embodiments, workers skilled in the art will recognize that changes may be made in form and detail without departing from the spirit and scope of the invention. For example, waveguides having other shapes or configurations are considered within the scope of the present invention in which incident light is focussed to a spot substantially located at the distal surface of the structure for near field coupling to a data surface of an optical disc.

What is claimed is:

1. An optical disc data storage system, comprising:

an optical disc for storing information in an optically reliable format on a data surface;

a slider proximate the data surface of the optical disc;

a light source; and an optical waveguide coupled to the slider having a radially graded index of refraction, the optical waveguide having a proximal end adjacent the light source and a distal end coupled to the slider and having an axis directed substantially toward the data surface to transmit light therebetween, the optical waveguide having a length whereby light incident on the proximal end is directed substantially toward a spot located on the distal end, wherein a distance between the distal end of the waveguide and the data surface is sufficiently small to provide coupling through an evanescent field between the spot and the data surface.

2. The optical disc data storage system of claim 1 wherein the light incident on the proximal end of the optical fiber is collimated.

3. The optical disc data storage system of claim 1 wherein light rays in the optical waveguide are focussed at a plurality of substantially evenly spaced focal points, at least one of the focal points located at the distal end of the waveguide.

4. The optical disc data storage system of claim 1 including an objective lens between the light source and the proximal end of the optical waveguide.

5. The optical disc data storage system of claim 1 wherein the distance between the distal end of the waveguide and the data surface is less than or about the wavelength of the light.

6. The optical disc data storage system of claim 1 including a profile on the proximal end of the optical waveguide to direct the incident light into the waveguide.

7. The optical disc data storage system of claim 1 wherein the graded index of refraction has a substantially quadratic profile.

8. The optical disc data storage system of claim 1 wherein the optical waveguide imparts a quadratic phase factor to a collimated light beam incident on the proximal end of the waveguide.

9. The optical disc data storage system of claim 1 wherein collimated light rays incident on the proximal end of the waveguide oscillates sinusoidally through a plurality of focal points, one of the plurality of focal points located at the distal end of the waveguide.

10. The optical disc data storage system of claim 1 wherein the light incident on the proximal end of the optical fiber is un-collimated.

* * * * *